Jan. 20, 1953 B. J. JABLONSKI 2,626,157

PHONOGRAPH RECORD AUTOMATIC CHANGING DEVICE

Filed April 16, 1948 2 SHEETS—SHEET 1

INVENTOR.
Bronislaw J. Jablonski,
BY
McMorrow, Berman + Davidson
Attorneys.

Jan. 20, 1953 B. J. JABLONSKI 2,626,157

PHONOGRAPH RECORD AUTOMATIC CHANGING DEVICE

Filed April 16, 1948 2 SHEETS—SHEET 2

INVENTOR.

Bronislaw J. Jablonski,

BY

McMorrow, Berman & Davidson

Attorneys.

Patented Jan. 20, 1953

2,626,157

UNITED STATES PATENT OFFICE 2,626,157

PHONOGRAPH RECORD AUTOMATIC CHANGING DEVICE

Bronislaw J. Jablonski, Ware, Mass.

Application April 16, 1948, Serial No. 21,427

1 Claim. (Cl. 274—10)

This invention relates to a phonograph record automatic changing device, and particularly to a descending supporting device adapted to receive the bottom record from a stack upon an automatic changing apparatus connected with a phonograph.

The main object of my invention is to provide a descending record receiving device for use with an automatic changer upon a phonograph for receiving the bottom record as it is dropped from the stack of records supported above the turntable in order to prevent this record from dropping the entire distance from the stack and perhaps cracking when it strikes the turntable.

Another object is to provide a descending record receiving device as indicated which is capable of receiving the record when it has merely dropped perhaps a fraction of an inch from the bottom of the stack of records upon the phonograph and then gently lowering this record into place upon the turntable below.

A further object is to provide such a record-lowering device, wherein three record-supporting fingers are mounted upon a vertically-movable rod within a hollow spindle which suddenly project outwardly radially in the upper portion of the spindle beneath the record to be caught and lowered when the tone arm is shifted out beyond the outside of the records, or turntable.

It is also an object of my invention to have the vertically-movable rod shifted by means of automatic devices within the phonograph controlled by the movement of the tone arm when it is shifted off the turntable in order to cause one operation of the lowering device for each shift of the tone arm.

It is likewise an object to have such a lowering device upon a phonograph furnished with an automatic record changer, which device is operated by the phonograph mechanism itself, but controlled by movements of the tone arm.

It is even an object to have such a lowering device which is of such construction that it may be installed upon existing machines or built into new machines according to new design of construction.

Other objects and the advantages of my invention will appear in further detail as the specification proceeds.

In order to facilitate ready comprehension of the features of my invention, the latter is illustrated by the accompanying drawings forming part hereof, and in which.

Throughout the various views, the same reference numerals indicate the same or like parts.

Figures 1, 2:
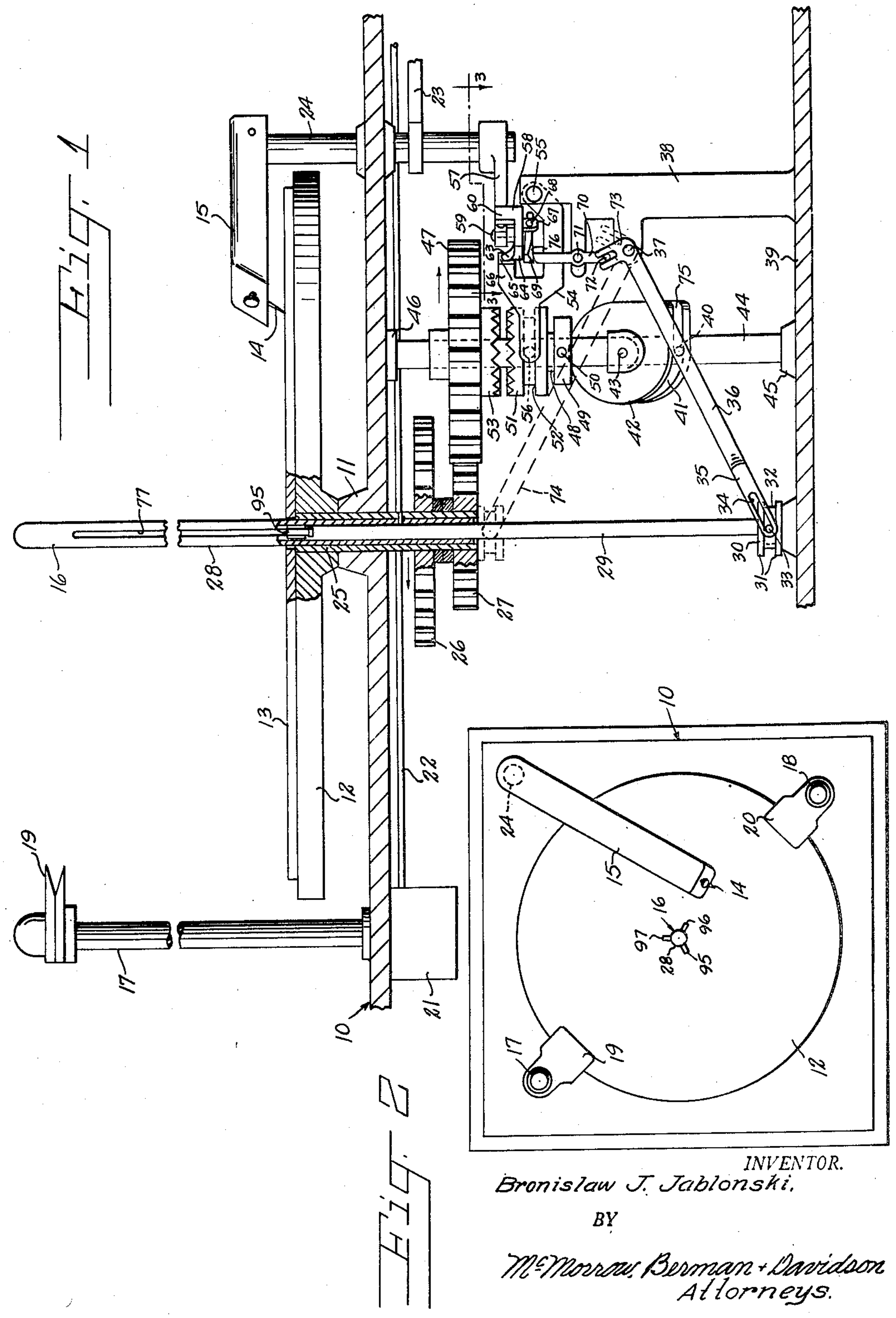
Figure 1 is a vertical section through a portion of the motor board and turntable with tone arm and one record-supporting post as well as automatic apparatus made according to the invention and embodying the same in a practical form, several of the parts being in section, while others are shown in full lines in order to disclose their mutual relationship.
Figure 2 is a reduced plan view of the motor board showing the record-supporting posts, turntable, tone arm and a portion of the record-lowering device, or as otherwise termed, descending record support.

When playing records upon electric phonographs and the like furnished with automatic record changers, it is, of course, well known, that records are played in succession from a stack supported upon corner posts or other means upon the machine, and one record is usually dropped at a time from the bottom of the stack to the turntable. However, it is only the first record that drops which lands on the soft felt of the turntable, whereas the further records dropping in succession drop on top of other records which are, of course, of relatively hard material and therefore fracture of some records frequently occurs with consequent loss. This is due to the fact that the records cannot drop straight down, but usually one edge first, and this edge takes the impact of the first contact which is frequently sufficient to crack the record and thus destroy it.

With a view to preventing such accidents and virtually to complete the automatic record-changing device of whatever nature, it is now proposed to add to the machine an automatically-operating mechanism or record-lowering device which will receive a record immediately below the stack when the same is dropped from the stack and thereafter gently lower the record upon the turntable, as will now be described.

Hence, in the practice of my invention, and referring again to the drawings, an electric phonograph having more or less conventional construction primarily includes a motor board, generally indicated at 10, which is usually of metal and has a center bearing 11 supporting the turntable 12 upon which a record 13 is located for playing by the needle 14 on the needle arm 15, the bearing serving, of course, to center the record or turntable post, generally indicated at 16. Upon the two diagonally opposite corners are mounted the record-supporting posts 17 and 18 having the record-engaging leaves 19 and 20 for supporting a stack of records centered upon the post 16 a distance above turntable 12.

Beneath the motor board each post has a casing 21 with a bar 22 connecting conventional mechanism within casing 21 with corresponding mechanism within the other casing, not shown, in more or less conventional manner and therefore superfluous to show and describe here in detail. In similar fashion, the control means in the casing are connected by a lever 23 to the swivel post 24 of the tone arm 15.

Returning to the turntable resting on bearing 11, the same is centered and fixed upon a sleeve 25 extending down through bearing 11 and through a drive gear 26 and a smaller spur gear 27 therebelow, both gears being fixed upon the sleeve 25 by means of keys or pins, not shown. The drive gear 26 is connected to and driven by a conventional motor, not shown, as it virtually forms no portion of this invention and may be understood by mere mention thereof, but within sleeve 25 is fixed a hollow tubular member 28 which forms the actual spindle of the turntable 12. Slidably extending up into the inner sleeve or hollow spindle 28 is an elevating rod 29 upon the lower end of which a ring 30 is secured by means of a pin or key provided with a pair of flanges 31 between which a collar 32 is rotatably mounted having a pair of pins 33 projecting from diametrically opposite sides thereof (one pin shown), the two pins projecting into slots 34 in both limbs of a fork 35 at one end of a lever 36 pivoted at 37 to an upright 38 fixed upon the bottom 39 of the phonograph mechanism.

Upon an intermediate portion of lever 36 is fixed a cam follower pin 40 projecting into the slot 41 of a cam 42 of the box cam type which is fixed by a pin 43 upon the vertical shaft 44 having the lower bearing 45 and an upper bearing 46 rotatably supporting the shaft in substantial parallelism to the elevating rod 29. Upon the upper portion of shaft 44 is loosely mounted a gear 47 meshed with gear 27 on the lower end of sleeve 25 which is driven by drive gear 26. Upon the same shaft 44 is also fixed a stop collar 49 by means of a pin 50 and above this stop collar is loosely mounted a clutch member 51 having an annular slot 52 for a purpose which will immediately be explained. Upon the lower side of gear 47 is fixed clutch portion 53 adapted to be engaged by the clutch member 51 when the latter is raised against it, the shaft 44 having one or more keys 48 fixed thereon and extending up into the clutch member 51 in order to positively rotate this clutch member whether it is in raised or lowered position. Since the clutch member 51 normally is disengaged, as shown in Figure 1, the gear 47 merely idles upon the shaft 44 which thus remains stationary, which is also true of clutch member 51 and box cam 42, as well as collar 49. In order to operate the clutch member 51, a lever 54 pivoted at 55 upon the upper end of upright 38 has at its opposite end a pin 56 slidably engaging in slot 52 of the clutch member 51, so that if any means serves to raise the lever 54 upon its pivotal mounting 55, the pin 56 will thereby raise the clutch member 51 into engagement with clutch portion 53 upon gear 47, thereby rotating shaft 44 with gear 47 and simultaneously rotating box cam 42. Lever 54 may be forked and have two pins 56.

Figure 3:
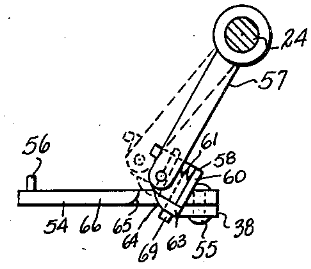
Figure 3 is an enlarged detail taken on line 3—3 of Figure 1, showing one stage of operation.
Figure 4:
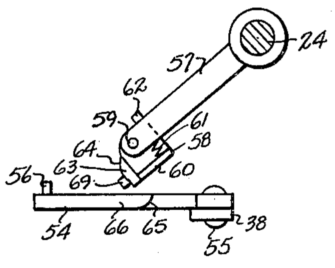
Figure 4 is another view of the same parts shown in another stage of operation.
Figure 5:
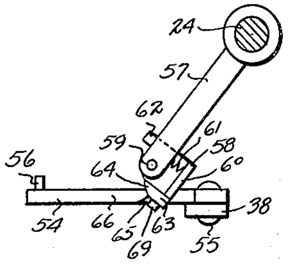
Figure 5 is still another view of the same parts in yet another stage of operation.

In order to operate lever 54, the shaft 24 of tone arm 15 has upon the lower end thereof an arm 57 rigidly secured to move with the shaft and tone arm and provided upon the end thereof with a swiveling trip lever 58 pivoted by means of a vertical pivot 59 to the arm 57. Upon one side of trip lever 58 is an upwardly-projecting lug 60 with a spring 61 disposed rearwardly of pivot 59 between lug 60 and the side of the arm 57, normally tending to turn trip lever 58 clockwise and engage an upwardly-extending post 62 thereon against the other side of the arm, as best seen in Figures 3, 4 and 5. Upon the forward portion of trip lever 58 is fixed an inclined cam member 63 having a curved forward working face 64 adapted to work against the inclined operating face 65 projecting from the upper intermediate portion of lever 54 which projects at 66 above the lower intermediate portion thereof. In addition to the foregoing, the trip lever 58 has a pair of downwardly-projecting lugs 67 through which a pivot 68 extends to support a normally horizontal trip bar 69 adapted to engage with the upper end of a lever 70 pivoted at an intermediate portion thereof to upright 38 by means of pivot pin 71, while the lower end of the same lever has a pin or stud 72 engaging in a fork 73 upon the inner end of previously-described lever 36. While pivoted trip bar 69 may be gravity operated inasmuch as the near end is the longer end, yet a spring may be inserted between the near end and the lower portion of trip lever 58 in order to urge the near end down, but this feature may be left to the skill of the workman making the device, as it is not shown.

However, the arrangement is such that when the tone arm 15 is swung out with the needle 14 located outside the turntable, the lever arm 57 on its swivel shaft 24 will engage the upper portion 66 of lever 54 in a special manner. It is, of course, understood that these members cooperate even during operation of the tone arm, while playing a record, as shown in Figure 1. While the tone arm is traveling inward, the front working face 64 of trip lever 58 will wipe against the extremity of the working face 65 of lever 54, as best shown in Figure 3, until lever arm 57 has swung so far in that lever 58 clears operating end 65 on upper portion 66 of lever 54. When the arm 57 is thereafter swung outwardly counter-clockwise, as shown in Figure 5, by shifting of the tone arm out beyond the outline of the turntable, the cam portion 63 has the inclined face thereof disposed beneath the member 65 on the upper portion of clutch-shifting lever 54. While the tone arm is still in motion moving outward, the lever arm 57 does likewise and causes the projection 66 on the mentioned lever 54 to ride up upon the inclined cam 63 and simultaneously this lever 54 with its pin 56 in slot 52 raises clutch member 51 into engagement with clutch portion 53 of gear 47. As soon as the clutch members are thus interengaged, shaft 44 rotates, its direction being counter-clockwise, and therefore the follower pin 40 riding in slot 41 in cam 42 will be raised to the highest peak of box cam 42 and thereby will cause the fork 35 of lever 36 to rise to the position indicated in broken lines at 74, bringing with it the flanged ring 30 and consequently raising elevating rod 29 into its uppermost raised position, the purpose of such raising of the rod being about to be explained with reference to receiving a record and lowering the same gently to the turntable or whatever record or records may already be deposited thereon. When the box cam 42 has raised lever 36, as just mentioned, and continues to rotate, it will presently lower this lever and cause the pin 40 therein to reach more or less horizontal dwell portion 75, but while the fork 35 of lever 36 is still in descending movement, the fork 73 at the other end thereof engaging pin 72 will swing lever 70 clockwise so that its upper end engages against the end of trip bar 69, thereby positively pushing the whole trip lever 58 with its inclined cam 63 and front working face 64 rearwardly or toward shaft 24 out of engagement with upper projections 66 of lever 54. As this lever 54 then is no longer supported by any portion of the inclined cam surfaces 63, this lever drops into its normal position shown in Figure 1, with consequent disengagement of clutch member 51 from clutch portion 53 of gear 47. The result is that shaft 44 immediately stops rotating and lever 36 remains in its lowermost position, as also shown in full lines in said Figure 1. The mentioned operation occurs even if the tone arm 15 remains outside the turntable and therefore repetition of the raising of rod 29 will not occur until after the tone arm has been used again for playing a record and has moved inwardly sufficiently to cause a new cycle of engagement between the curved front working surface 64 of trip lever 58 and the working face 65 of projection 66 on clutch-shifting lever 54. However, such inward travel of the tone arm 15 causes simultaneous inward travel of arm 57 and consequently the trip bar 69 is pulled or brought clockwise out of registry with the upper end of lever 70 and is therefore released so that this lever has no further effect on the trip arm during that cycle of the operation. It may be noted that in order to avoid misoperation, the lower surface of the forward portion of pivoted trip bar 69 is inclined toward the right side at 76, so that when the tone arm 15 is being shifted outwardly upon its return movement and arm 57 is following the upper end of lever 70 will engage against this inclined lower surface 76 and will cause the outer end of trip bar 69 to be raised into the position shown in full lines in Figure 1. When the long lever 36 is caused to rise for the purpose of raising rod 29, the fork 73 will assume the rightwardly-inclined position indicated in broken lines and thereby swing lever 70 to the left, allowing trip bar 69 to drop into a lower position so that when lever 36 later is caused to descend by rotation of box cam 42, the short lever 70 operated by fork 73 will then engage at its upper end against the near end of trip bar 69 and thereby push the trip lever 58 out of contact with the upper projection 66 and its operating face 65 on clutch-operating lever 54.

Figures 6, 7, 8, 9:
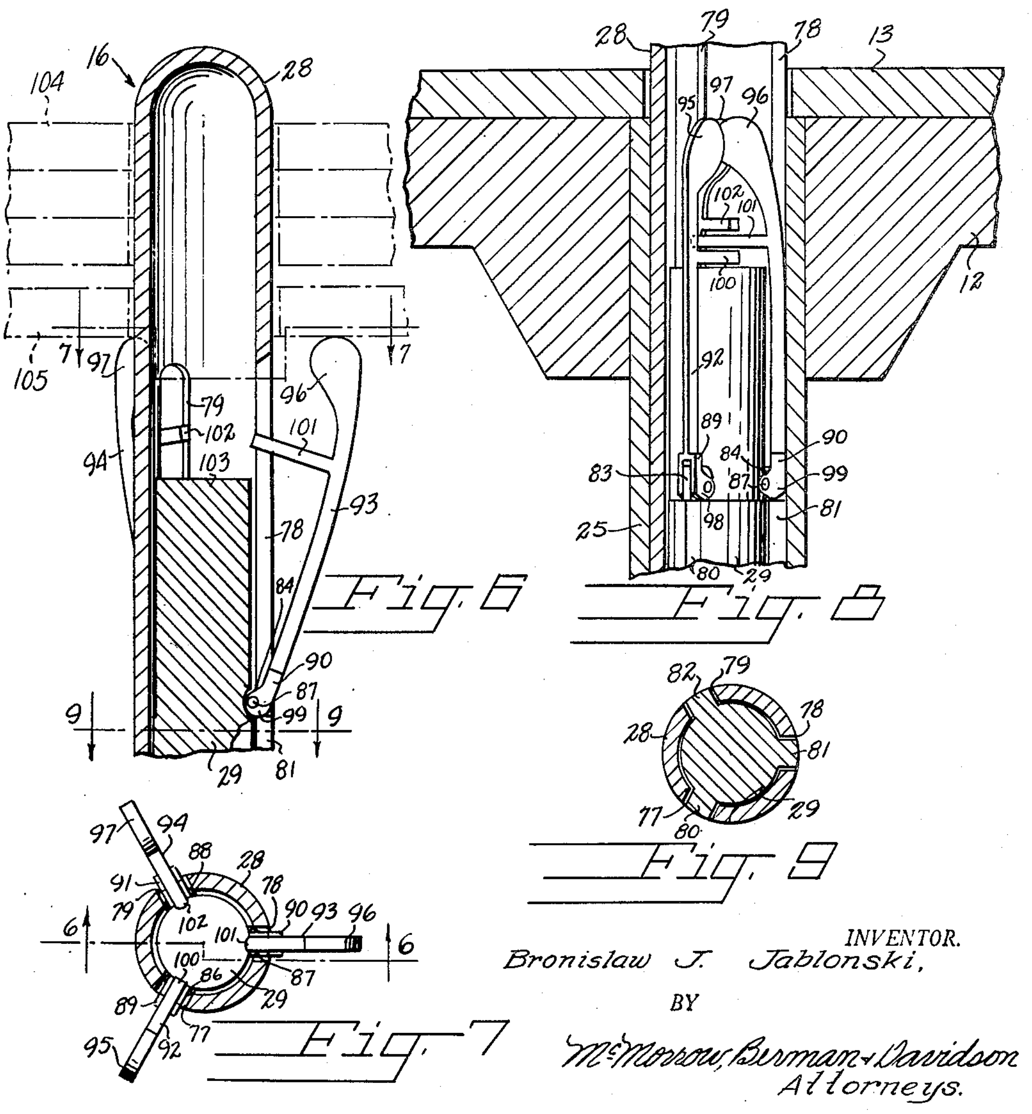
Figure 6 is an enlarged vertical section of the spindle showing the record-supporting fingers in position to receive a record indicated in broken lines.
Figure 7 is a section taken on line 7—7 in Figure 6.
Figure 8 is an enlarged vertical but fragmentary section of an intermediate portion of the spindle showing the record-supporting fingers in withdrawn position within the spindle.
Figure 9 is a transverse section taken on line 9—9 in Figure 6.

Attention being now directed to the elevating rod 29, it may be noted that the hollow tubular post 28 in which it is slidable has three longitudinal slots 77, 78, 79 into which three radially-projecting ribs 80, 81, 82 project from rod 29. Upon the upper ends of the mentioned radial ribs are disposed the radial pivot lugs 83, 84, 85 provided with pivot pins 86, 87, 88 for the lower fork members 89, 90 and 91 of upwardly-extending record-supporting fingers 92, 93, 94 terminating at their upper ends in record-supporting heads 95, 96, 97. Upon the lower ends of forks 89, 90 and 91 are formed flattened stop shoulders 98, 99, etc., serving to engage against the upper ends of radial ribs 81, 80 and 82, in order to limit the outward movement of the record-supporting members 92 to 94 and prevent undue and uncontrolled movement thereof, beyond the positions shown in Figures 2, 6 and 7. Upon each of the supporting fingers 92, 93 and 94, below the record-engaging heads thereof, are rigid inwardly-projecting guide arms 100, 101, 102 extending radially inward through slots 77, 78, 79 above the upper extremity 103 of rod 29, these inwardly projecting arms serving to prevent sidewise bending of the fingers and to guide the latter into the slots when the vertical rods 29 is lowered. When elevating rod 29 is lowered, the three record-supporting fingers are, of course, drawn within the outline of the hollow post 28 by engagement with the upper end of sleeve 25 in the turntable 12, so that a nested position of these members results, as best shown in Figure 8, and also partially shown in Figure 1. In this position, the turntable 12 is free from any projection above the same except the spindle 28, but when a stack of records indicated at 104 in broken lines has one record, indicated in broken lines at 105, dropped therefrom, this will naturally occur as the tone arm has left the last record and has moved out to the edge of the turntable, which movement will cause, as already described, the elevating rod 29 to rise and present the record-carrying heads 95, 96, 97 to the upper ends of slots 77, 78, 79, whence they will drop out into projected position, as shown in Figure 6. It may be noted that in the nested position, when the elevating rod is in its lowest position, the three guide arms 100, 101, 102 are nested one above the other within the hollow center post 28, but as soon as the fingers are raised above the level of the turntable and/or any records that may be lying on the same, the fingers will tend to project outwardly by gravity, as already mentioned, and by the time they reach the upper ends of their slots, they are in position to receive the record 105, as also indicated. As the apparatus for lowering the rod 29 is then in operation, below the motor board 10, the form of the box cam 42 will largely determine the rate of descent of elevating rod 29 and thereby determine also the rate of speed at which supporting heads 95, 96, 97 of the record-supporting fingers will lower record 105 onto the turntable or onto the record 13 lying thereon. Of course, as soon as the record has been lowered into position, the supporting fingers pivoted on rod 20 will again resume their lowered nested position, as shown in Figure 8, and will not again take any part in the operation of the machine until the tone arm is again swung out from a played record when the cycle of operation will be repeated.

Inasmuch as the lowering of the records can thus be controlled, it will be possible to have a much higher stack of records on the machine about the hollow spindle 28 than is usual because the dropping of the records is controlled in exactly the same manner for each record by operation of rod 29 and its record-supporting fingers 92, 93, 94.

While I have shown and described a certain mechanism below the motor board for operating the elevating rod 29 and thereby causing operation of the record-supporting members last described, it is evident that I may use other apparatus serving the same purpose for elevating and lowering rod 29 with its record-supporting members.

It is manifest that other variations may be resorted to and parts and features may be modified or used without others within the scope of the appended claim.

Having now fully described my invention, I claim:

In a phonograph of the type having a turntable with means for supporting a stack of records above the turntable and dropping one record at a time toward the turntable from the stack, and a tone arm supported by a vertical axis first shaft to swing inwardly over the turntable and to swing outwardly beyond the peripheral edge of the turntable, and drive means for rotating the turntable, for operating said record stack supporting and dropping means, and for swinging the tone arm outwardly to a position beyond the peripheral edge of the turntable from an inward record playing position, the improvement which comprises record lowering means comprising a spindle extending vertically through the center of the turntable including a vertical tubular post, an elevating rod extending slidably through said post from the lower end of the post, a first gear fixed on said post beneath the turntable, a second vertical axis rotary shaft at one side of said post and beneath said turntable, a second gear idling upon said second shaft and meshed with said first gear, clutch means acting between said second gear and said second shaft, a box cam fixed on said second shaft having a raised portion and a dwell portion, a stationary upright on the phonograph, a first lever pivoted adjacent one end on said upright and having its other end operatively engaged with said elevating rod, said first lever having a follower pin intermediate its ends engaging said box cam whereby said first lever is raised and lowered upon rotation of said second shaft, said first tone arm shaft having a fixed lever arm having a pivoted trip thereon, said clutch means having a clutch lever pivoted on said stationary upright having a first portion operatively engageable with said clutch means and a second portion engageable by said trip for pivoting said clutch lever into operative engagement with the clutch means as the tone arm is swung outwardly beyond the peripheral edge of the turntable, the engagement of the clutch means producing rotation of said second shaft and said box cam in a direction to pivot said first lever upwardly and thereby elevate said elevating rod, and means for disengaging said trip from said clutch lever at the end of each cycle of operation to permit said clutch lever to fail and produce disengagement of said clutch means.

BRONISLAW J. JABLONSKI.

REFERENCES CITED

The following references are of record in the file of this patent:

UNITED STATES PATENTS

| Number | Name | Date |
|---|---|---|
| 1,879,291 | Johnson et al. | Sept. 27, 1932 |
| 2,512,701 | Weaver | June 27, 1950 |
| 2,515,283 | Wissner | July 18, 1950 |
| 2,544,230 | Johnson | Mar. 6, 1951 |

FOREIGN PATENTS

| Number | Country | Date |
|---|---|---|
| 64,302 | Denmark | Feb. 18, 1946 |